(12) United States Patent
Verma et al.

(10) Patent No.: US 11,190,547 B2
(45) Date of Patent: Nov. 30, 2021

(54) CELLULAR INTERNET OF THINGS BATTERY DRAIN PREVENTION IN MOBILE NETWORKS

(71) Applicant: Palo Alto Networks, Inc., Santa Clara, CA (US)

(72) Inventors: Sachin Verma, Danville, CA (US); Leonid Burakovsky, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 78 days.

(21) Appl. No.: 16/588,563

(22) Filed: Sep. 30, 2019

(65) Prior Publication Data
US 2021/0099487 A1 Apr. 1, 2021

(51) Int. Cl.
| | |
|---|---|
| H04L 29/06 | (2006.01) |
| H04W 8/18 | (2009.01) |
| H04W 12/088 | (2021.01) |
| H04W 12/122 | (2021.01) |
| H04W 12/125 | (2021.01) |

(52) U.S. Cl.
CPC .......... *H04L 63/20* (2013.01); *H04L 63/0227* (2013.01); *H04W 8/18* (2013.01); *H04W 12/088* (2021.01); *H04W 12/122* (2021.01); *H04W 12/125* (2021.01)

(58) Field of Classification Search
CPC ....... H04W 12/08–12/128; H04W 8/18; H04L 63/02–029; H04L 63/20
See application file for complete search history.

(56) References Cited

U.S. PATENT DOCUMENTS

| | | | | |
|---|---|---|---|---|
| 8,619,799 B1 * | 12/2013 | Thodupunoori | ...... | H04W 68/02 370/401 |
| 10,448,268 B1 * | 10/2019 | Jaya | ...................... | H04W 24/04 |
| 2010/0124223 A1 * | 5/2010 | Gibbs | .................. | H04W 12/12 370/389 |

(Continued)

OTHER PUBLICATIONS

M. Q. Khan, "Signaling Storm Problems in 3GPP Mobile Broadband Networks, Causes and Possible Solutions: A Review," 2018 International Conference on Computing, Electronics & Communications Engineering (iCCECE), 2018, pp. 183-188, doi: 10.1109/iCCECOME.2018.8658708. (Year: 2018).*

(Continued)

*Primary Examiner* — Madhuri R Herzog
(74) *Attorney, Agent, or Firm* — Van Pelt, Yi & James LLP

(57) ABSTRACT

Techniques for cellular Internet of Things (IoT) battery drain prevention in mobile networks (e.g., service provider networks for mobile subscribers) are disclosed. In some embodiments, a system/process/computer program product for cellular IoT battery drain prevention in mobile networks includes monitoring network traffic on a service provider network at a security platform to identify a misbehaving application based on a security policy, wherein the service provider network includes a 4G network or a 5G network; extracting subscription identifier information for network traffic associated with the misbehaving application at the security platform; and enforcing the security policy at the security platform to rate limit paging messages sent to an endpoint device using the subscription identifier information and based on the security policy.

17 Claims, 8 Drawing Sheets

(56) References Cited

U.S. PATENT DOCUMENTS

| | | | | |
|---|---|---|---|---|
| 2010/0184458 A1* | 7/2010 | Fodor | ............... | H04W 52/0216 |
| | | | | 455/522 |
| 2018/0109554 A1* | 4/2018 | Reddy | ..................... | H04L 63/08 |
| 2020/0178065 A1* | 6/2020 | Huber | ................... | H04W 76/28 |

OTHER PUBLICATIONS

3GPP, 3GPP TS 23.501 V16.2.0 (Sep. 2019), 3rd Generation Partnership Project, Technical Specification Group Services and System Aspects,System Architecture for the 5G System (5GS), Stage 2, (Release 16), retrieved Sep. 24, 2019.
3GPP, 3GPP TS 29.244 V16.1.0 (Sep. 2019), 3rd Generation Partnership Project, Technical Specification Group Core Network and Terminals, Interface between the Control Plane and the User Plane Nodes, Stage 3, (Release 16), retrieved Sep. 18, 2019.
3GPP, 3GPP TS 29.274 V16.1.0 (Sep. 2019), 3rd Generation Partnership Project, Technical Specification Group Core Network and Terminals, 3GPP Evolved Packet System (EPS), Evolved General Packet Radio Service (GPRS), Tunnelling Protocol for Control plane (GTPv2-C), Stage 3, (Release 16), retrieved Sep. 19, 2019.
Gelenbe et al.. Detection and Mitigation of Signaling Storms in Mobile Networks, 2016 International Conference on Computing, Networking and Communications, Wireless Networks, IEEE.
Gorbil et al., Storms in Mobile Networks, IEEE Transactions on Emerging Topics in Computing, Nov. 5, 2014.
Sebastian Thalanany, The Engine of Wireless Innovation, 5G End-to-End Architecture Framework, v3.0.8, Aug. 28, 2019.
Serror et al., Impact of Paging Channel Overloads or Attacks on a Cellular Network, WiSe '06, Sep. 29, 2006.

* cited by examiner

| NAME | Application | Profile | User | Zone | Address | Service | Action | Zone | Address |
|---|---|---|---|---|---|---|---|---|---|
| | | | | Source | | | | Destination | |
| 1 Battery_sarver_by_Rate _Limit_paging_Policy | Misbehave App 1 | | 5G-S-TMSI & TMSI | any | any | ✱application -default | ⊘Allow | any | any |

502 — Misbehaving Application

504 — Security with rate limiting rules for paging messages

506 — User-ID column with TMSI and/or 5G-S-TMSI identities

FIG. 5

CELLULAR INTERNET OF THINGS BATTERY DRAIN PREVENTION IN MOBILE NETWORKS

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 5 is a screenshot diagram of a security policy for performing cellular IoT battery drain prevention in mobile networks in accordance with some embodiments.

DETAILED DESCRIPTION

Figure 1A:
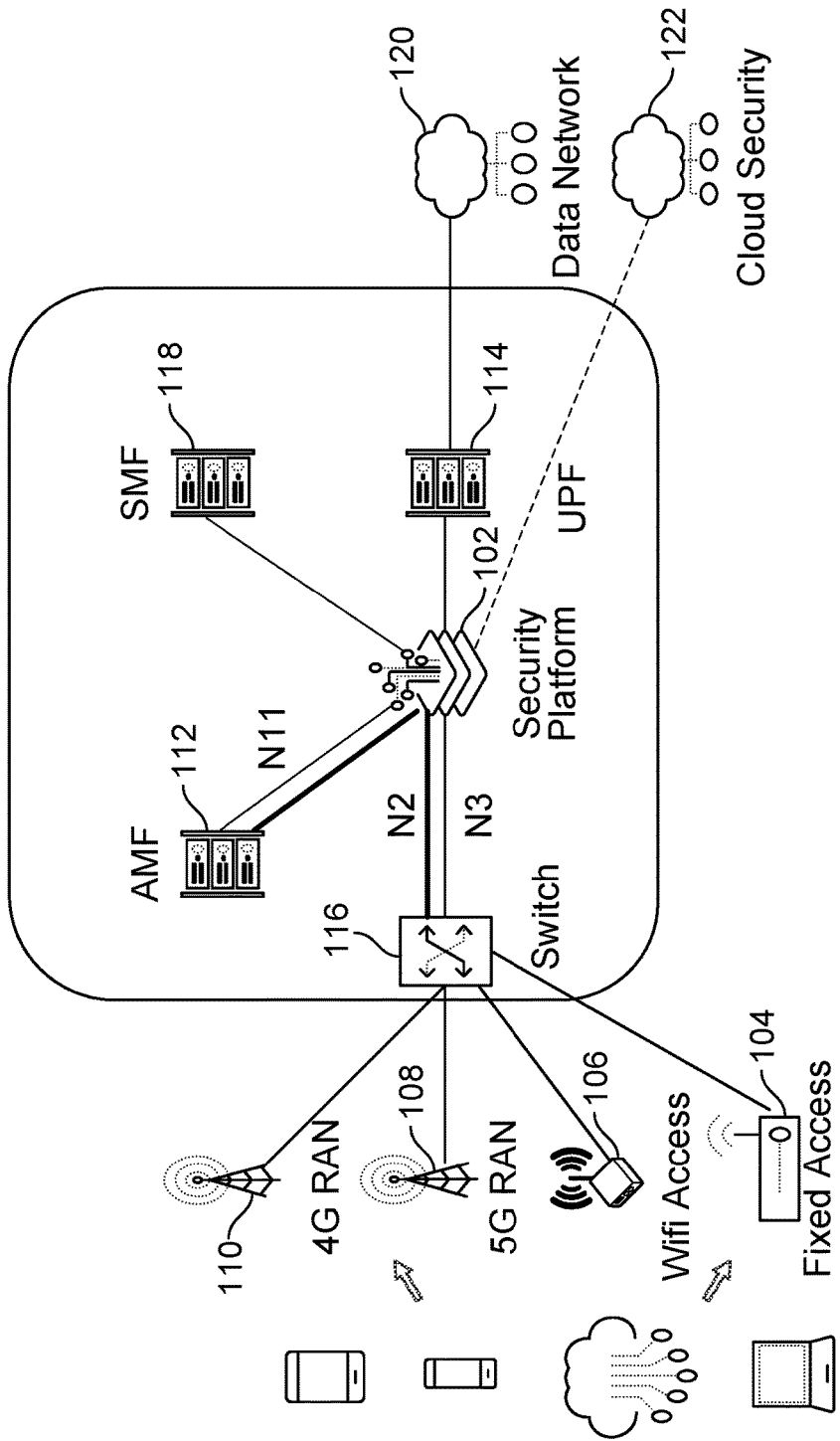
FIG. 1A is a block diagram of a 5G wireless network with a security platform deployment for cellular Internet of Things (IoT) battery drain prevention in mobile networks in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls and Palo Alto Networks' VM Series virtualized next generation firewalls).

For example, Palo Alto Networks' next generation firewalls enable enterprises and service providers to identify and control applications, users, and content—not just ports, IP addresses, and packets—using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Technical and Security Challenges in Today's Mobile Networks for Service Providers In today's service provider network environments, the service provider can typically only implement a static security policy for wireless devices communicating over the service provider's wireless network (e.g., the service provider cannot define a security/firewall policy on a per endpoint basis and/or a per flow basis for wireless devices communicating over the service provider's wireless network), and any changes generally require network infrastructure updates.

For example, an increasing number of network connected devices including Internet of Things (IoT) devices are presenting new technical and security challenges in today's mobile networks for service providers. Generally, energy is an important but limited resource for an electronics device, such as IoT devices that communicate with mobile networks (e.g., 4G and 5G cellular networks). For IoT devices, it is often desired for the battery of a given IoT device to last for a relatively long period of time (e.g., years or tens of years, such as for IoT devices that are deployed in many different locations including remote locations for various applications, including remote security/camera monitoring, agricultural, weather, and/or various other applications). In some cases, chatty and/or misbehaving applications can cause unnecessary battery drain for mobile devices including IoT devices that communicate with mobile networks. As such, these example technical and security problems can increase operational costs associated with operating and managing mobile devices including IoT devices for a service provider due to recharging and battery replacement activities and associated costs.

According to the NGMN Alliance 5G End-to-End Architecture Framework draft requirements, Version 3.0.8, Aug. 28, 2019 (hereinafter referred to as NGMN Alliance 5G End-to-End Architecture Framework, which is available at https://www.ngmn.org/wp-content/uploads/Publications/2019/190916-NGMN_E2EArchFramework_v3.0.8.pdf), battery longevity is a key consideration for some endpoint/user equipment (e.g., "The attributes and capabilities, associated with them are diverse, such as, high-power, low-power, long battery life, low-cost, high performance, latency sensitive, high-reliability, precision sensitive." NGMN Alliance 5G End-to-End Architecture Framework, at page 58). It is also recognized that security attacks can target endpoint/user equipment including battery exhaustion attacks targeting IoT devices that run on batteries (e.g., "A possible future threat is battery exhaustion attacks against devices—either indiscriminately at large scale or targeting individual devices whose disabling has value to the attacker. This is relevant primarily for IoT devices that run on batteries and cannot be easily or frequently recharged. If large scale battery exhaustion attacks become a significant problem, then network-based detection and prevention measures, including traffic analysis and management, may be needed. For individual devices whose availability is particularly important, defence against battery exhaustion attacks may be best implemented in the devices themselves." NGMN Alliance 5G End-to-End Architecture Framework, at page 62).

Thus, technical and security challenges with service provider networks exist for devices in mobile networks. As such, what are needed are new and improved technical and security techniques for devices in such service provider network environments (e.g., mobile networks, including 4G and 5G cellular networks). Specifically, what are needed are new and improved solutions for monitoring service provider network traffic and applying security policies (e.g., firewall policies) for devices communicating on service provider networks to address these new and evolving technical and security challenges on mobile networks.

Overview of Techniques for Cellular Internet of Things (IoT) Battery Drain Prevention in Mobile Networks Various techniques for enhanced security platforms (e.g., a firewall (FW)/Next Generation Firewall (NGFW), a network sensor acting on behalf of the firewall, or another device/component that can implement security policies using the disclosed techniques) within service provider network environments are disclosed. Specifically, various system architectures for implementing and various processes for providing security platforms within service provider network environments that can enhance security and performance for endpoint/user equipment in mobile networks for service providers, such as for 4G and 5G cellular networks, are disclosed. More specifically, various system architectures for implementing and various processes for providing security platforms within service provider network environments for cellular IoT battery drain prevention in mobile networks for service providers, such as for 4G and 5G cellular networks, are disclosed.

Accordingly, various techniques for cellular Internet of Things (IoT) battery drain prevention in mobile networks (e.g., service provider networks for mobile subscribers) are disclosed. In some embodiments, a system/process/computer program product for cellular IoT battery drain prevention in mobile networks includes monitoring network traffic on a service provider network at a security platform to identify a misbehaving application based on a security policy, wherein the service provider network includes a 4G network or a 5G network; extracting subscription identifier information (e.g., International Mobile Subscription Identity (IMSI) related information) for network traffic associated with the misbehaving application at the security platform; and enforcing the security policy at the security platform to rate limit paging messages sent to an endpoint device (e.g., a cellular Internet of Things (IoT) device(s)) using the subscription identifier information and based on the security policy.

In one embodiment, the security platform is configured with a plurality of security policies for each of a plurality of misbehaving applications.

In one embodiment, the security platform parses Packet Forwarding Control Protocol (PFCP) Session Establishment Request and PFCP Session Establishment Response messages to extract the subscription identifier information, and wherein the subscription identifier information is identified by International Mobile Subscription Identity (IMSI) related information.

In one embodiment, the security platform monitors wireless interfaces including a plurality of interfaces for a control protocol and user data traffic in a mobile core network for a 4G network.

In one embodiment, the security platform monitors wireless interfaces including a plurality of interfaces for a control protocol and user data traffic in a mobile core network for a 5G network.

In one embodiment, the security platform is configured to perform a firewall service using the subscription identifier information.

In one embodiment, a system/process/computer program product for cellular IoT battery drain prevention in mobile networks further includes capturing a traffic log for the detected misbehaving application sending paging messages based on the security policy or a security profile (e.g., a vulnerability profile, such as further described below).

In one embodiment, a system/process/computer program product for cellular IoT battery drain prevention in mobile networks further includes sending the traffic log and an associated International Mobile Subscriber Identity (IMSI) to a server/data store (e.g., an external server/data store); and correlating the IMSI to, for example, a Temporary Mobile Subscriber Identity (TMSI) in 4G networks and to a 5G-S-TMSI in 5G networks.

In one embodiment, a system/process/computer program product for cellular IoT battery drain prevention in mobile networks further includes sending the correlated TMSI/5G-S-TMSI to the security platform in a message (e.g., in a syslog message that includes the TMSI or 5G-S-TMSI information to the same security platform and/or a different security platform(s)).

In one embodiment, a system/process/computer program product for cellular IoT battery drain prevention in mobile networks further includes parsing the message (e.g., syslog message) to extract the TMSI/5G-S-TMSI as a User-ID parameter for performing security policy enforcement using the security platform (e.g., to facilitate rate limiting (e.g., throttling) of paging messages using the correlated TMSI/5G-S-TMSI (e.g., the security policy can be enforced by the security platform using this User-ID to enforce a configured threshold for rate limit paging messages to a cellular IoT device per TMSI/5G-S-TMSI)).

As an example use case scenario, an attacker may attempt to attack endpoint/mobile devices (e.g., IoT devices) by sending messages (e.g., paging messages, which can generally be used for sending network data to endpoint/user equipment, over various protocols for 4G networks and over the Next Generation Access Protocol (NGAP) over the Stream Control Transmission (SCTP) protocol for 5G networks) to drain batteries of such targeted endpoint/mobile devices (e.g., IoT devices).

In an example implementation, rate limiting of paging messages per application which are sent via mobile networks to endpoint/user equipment (e.g., cellular IoT devices with any form of Subscriber Identity Module (SIM) card) is performed. In this example, the security platform deployed for monitoring network traffic on a mobile network can identify a chatty and/or misbehaving application (e.g., also referred to simply as a misbehaving application, in which an application can be determined to be misbehaving based on a security policy configuration and/or dynamic profile, such as using heuristic-based techniques and/or machine learning techniques (MLT), such as further described below). The network traffic associated with the misbehaving application can then be captured in a traffic log along with the International Mobile Subscriber Identity (IMSI) using the security platform.

In this example implementation, the following operations can be performed to facilitate rate limiting of paging messages per application which are sent via mobile networks to endpoint/user equipment: (1) monitor network traffic at a security platform (e.g., deployed on the access side of a mobile network to throttle/rate limit signaling messages sent to IoT devices with chatty/misbehaving applications) for an application sending paging messages based on a security policy or a security profile (e.g., a vulnerability profile, such as further described below) to identify a misbehaving application (e.g., an application can be determined to be misbehaving based on a security policy configuration and/or dynamic profile, such as using heuristic-based techniques and/or machine learning techniques (MLT), such as further described below); (2) capture a traffic log for the detected application sending paging messages based on the security policy or the security profile application; (3) send traffic log and an associated International Mobile Subscriber Identity (IMSI) to a server/data store (e.g., an external server/data store); (4) correlate the IMSI to, for example, a Temporary Mobile Subscriber Identity (TMSI) in 4G networks and to a 5G-S-TMSI in 5G networks; (5) send the correlated TMSI/5G-S-TMSI to the security platform in a message (e.g., in a syslog message that includes the TMSI or 5G-S-TMSI information to the same security platform and/or a different security platform(s)); (6) the security platform parses the message and extracts the TMSI/5G-S-TMSI as a User-ID parameter for performing security policy enforcement; and (7) perform a rate limiting (e.g., throttling) of paging messages using the correlated TMSI/5G-S-TMSI (e.g., the security policy can be enforced by the security platform using this User-ID to enforce a configured threshold for rate limit paging messages to a cellular IoT device per TMSI/5G-S-TMSI). As an example, the security policy can be configured to limit to one paging message per day, one paging message per week for a given IoT device, and/or some other configured limit value per a specified time period for such paging messages per such endpoint/user equipment.

The misbehaving application can be detected based on a user defined security policy and/or dynamically defined based on a security profile such as a vulnerability profile to rate limit paging messages to, for example, a cellular IoT device per TMSI/5G-S-TMSI. For example, security policies can be configured to specify/define the application and rate limiting configurations, and when traffic from this application is detected, then a 5-Tuple (Source/Destination Port, Source/Destination IP, etc. and IMSI) can be extracted using the security platform (e.g., a firewall device or another network device, which can perform rate limiting paging messages over the mobile network, such as a 4G or 5G cellular network), such as will be further described below.

Example IoT devices (e.g., Cellular IoT (CIoT) devices) that can benefit from the disclosed battery drain prevention techniques include, but are not limited to, the following: smart logistics, smart farming, smart parking, smart traffic management, smart environment, and smart wearables.

These and other embodiments and examples for providing for cellular IoT battery drain prevention in mobile networks will be further described below.

Example System/Process Architectures for Cellular IoT Battery Drain Prevention in Mobile Networks for Service Providers Generally, 5G is the $5^{th}$ generation of the mobile communications system. The 3rd Generation Partnership Project (3GPP) includes seven telecommunications standard development organizations (ARIB, ATIS, CCSA, ETSI, TSDSI, TTA, and TTC). The project covers cellular telecommunications network technologies, including radio access, the core transport network, and service capabilities. The specifications also provide hooks for non-radio access to the core network and for interworking with Wi-Fi networks, and other organizations including ITU, IETF, and ETSI are developing 5G standards. Some of the improvements of the new 5G network standards include, for example, low latency (e.g., approximately less than 10 milliseconds (MS)), high throughput (e.g., multi-Gbps), distribution, network function virtualization infrastructure, as well as orchestration, analytics, and automation.

The 5G architecture is defined in 3GPP TS 23.501 v16.2.0 (e.g., available at https://portal.3gpp.org/desktopmodules/Specifications/SpecificationDetails.aspx?specificationId=3144) as service-based, and the interaction between Network Functions (NFs) is represented in two ways: (1) service-based representation, where NFs within the Control Plane (CP) enable other authorized network functions to access their services; and (2) reference point representation, which focuses on the interactions between pairs of NFs defined by point-to-point reference points between any two network functions.

Figure 1B:
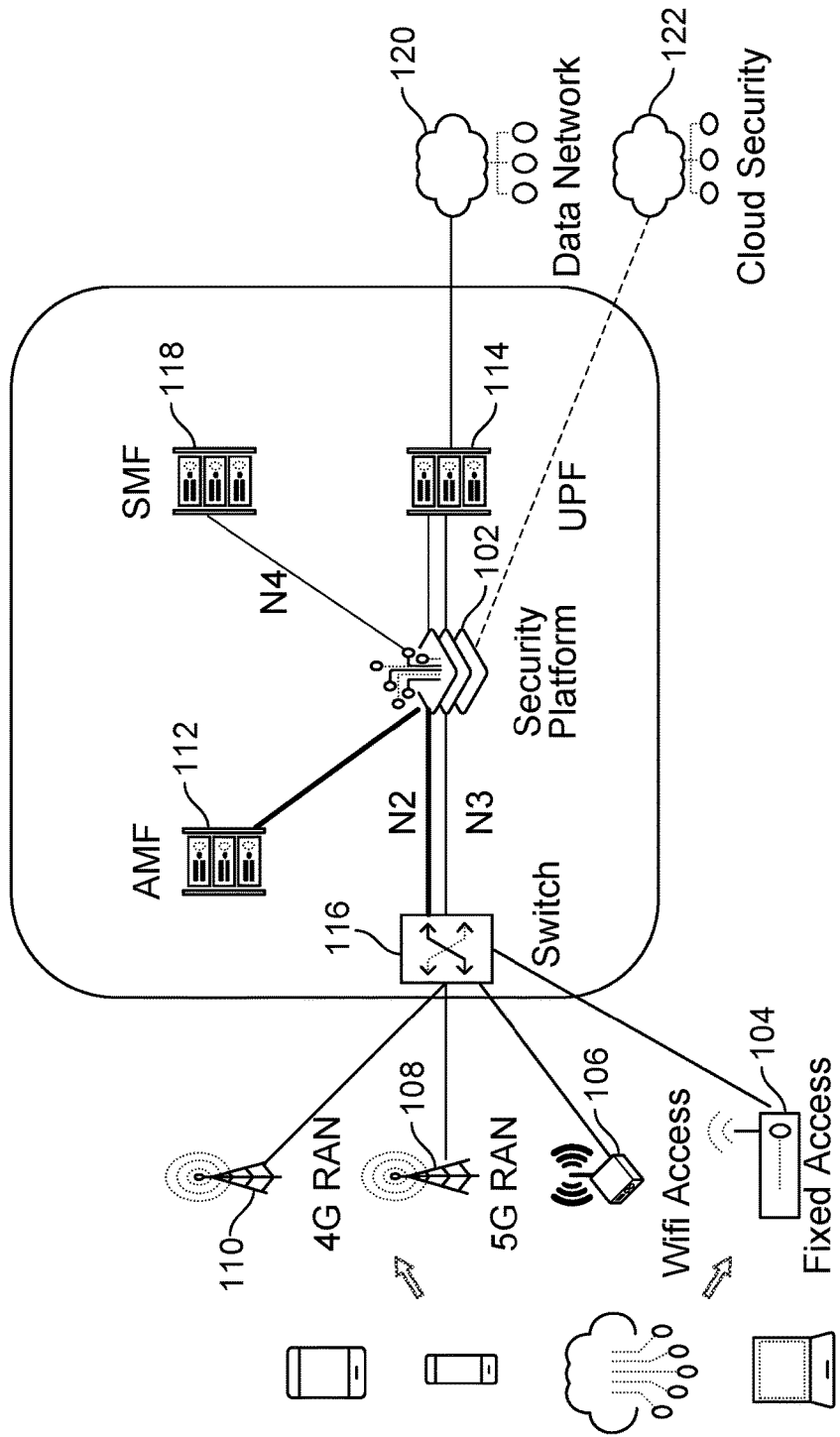
FIG. 1B is another block diagram of a 5G wireless network with a security platform deployment for cellular IoT battery drain prevention in mobile networks in accordance with some embodiments.

In the 5G architecture, the User Plane Protocol stack between the access network and the core over the backbone network over the N3 interface (e.g., between a Radio Access Network (RAN) and a UPF element) will be based on the GPRS Tunnel Protocol User Plane (GTP-U) over UDP protocol (e.g., such as shown in FIGS. 1A-B as further described below), and also over the N4 interface (e.g., between a UPF element and SMF element) will be based on the Packet Forwarding Control Protocol (PFCP) over UDP protocol (e.g., such as shown in FIGS. 1A-B as further described below). The Control Plane NFs in the 5G system architecture shall be based on the service-based architecture. HTTP/2 will be the protocol used over service-based interfaces. A new 5G Access Network protocol will be based over Stream Control Transmission Protocol (SCTP).

Accordingly, in some embodiments, the disclosed techniques include providing a security platform (e.g., PANOS executing on an NGFW available from Palo Alto Networks, Inc. or another security platform/NFGW) configured to provide DPI capabilities (e.g., including stateful inspection) of, for example, GTP-U sessions and new HTTP/2 based TCP sessions that facilitate a correlation between monitored GTP-U tunnel sessions and new HTTP/2 based TCP sessions as further described below, and as another example, correlation between monitored GTP-U tunnels (e.g., on the N3 interface) and PFCP sessions (e.g., on the N4 interface) as further described below.

In some embodiments, a security platform (e.g., PANOS executing on an NGFW available from Palo Alto Networks, Inc. or another security platform/NFGW) is configured to provide the following DPI capabilities: stateful inspection of N3 GTP-U tunnels and/or N4 GTP-U tunnels; content inspection of N3 GTP-U tunnels (e.g., to inspect content of inner IP sessions of N3 GTP-U tunnels) and/or N4 PFCP sessions (e.g., to inspect content of N4 PFCP sessions); support for 3GPP Technical Specification (TS) 29.274 Version 16.1.0 (e.g., and later releases, available at https://portal.3gpp.org/desktopmodules/Specifications/SpecificationDetails.aspx?specificationId=1692) for Procedures for the 5G system to support 5G cellular technology; and support for 3GPP Technical Specification (TS) 29.281 Version 15.6.0 (e.g., and later releases, available at https://portal.3gpp.org/desktopmodules/Specifications/SpecificationDetails.aspx?specificationId=1699) for GTP-U protocol.

FIG. 1A is a block diagram of a 5G wireless network with a security platform deployment for cellular Internet of Things (IoT) battery drain prevention in mobile networks in accordance with some embodiments. FIG. 1A is an example service provider network environment for a 5G network architecture that includes a Security Platform 102 in a Control Plane/signaling Network (e.g., the security platforms can be implemented using a firewall (FW)/Next Generation Firewall (NGFW), a network sensor acting on behalf of the firewall, or another device/component that can implement security policies using the disclosed techniques) for providing cellular IoT battery drain prevention in mobile networks as further described below. As shown, the 5G network can also include Fixed/Wired access as shown at 104, Non-3GPP access such as Wi-Fi Access as shown at 106, 5G Radio Access Network (RAN) access as shown at 108, 4G RAN access as shown at 110, and/or other networks (not shown) to facilitate data communications for subscribers (e.g., using User Equipment (UE), such as smart phones, laptops, computers (which may be in a fixed location), and/or other cellular enabled computing devices/equipment, such as IoT/CIoT devices, or other network communication enabled devices) including over a Data Network (e.g., the Internet) 120 to access various applications, web services, content hosts, etc. and/or other networks (not shown). As shown, each of the 5G network access mechanisms 104, 106, 108, and 110 are in communication with 5G User Plane Functions (UPF) 114, which pass through Security Platform 102 via a Switch 116. As also shown, each of the 5G network access mechanisms 104, 106, 108, and 110 are in communication with 5G Access and Mobility Management Function (AMF) 112 and 5G Core Control/Signaling Session Management Function (SMF) 118.

Referring to FIG. 1A, network traffic communications are monitored using Security Platform 102. For example, Security Platform 102 can monitor 5G core/control signaling network traffic communications to facilitate the disclosed techniques, such as for providing cellular IoT battery drain prevention in mobile networks (e.g., including a correlation between monitored GTP-U tunnel sessions and new HTTP/2 based TCP sessions) as further described below. As shown, network traffic communications are monitored/filtered in the 5G network using Security Platform 102 (e.g., (virtual) devices/appliances that each include a firewall (FW), a network sensor acting on behalf of the firewall, or another device/component that can implement security policies using the disclosed techniques) configured to perform the disclosed security techniques as further described below. In addition, Security Platform 102 can also be in network communication with a Cloud Security Service 122 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware (e.g., misbehaving applications that can cause unnecessary battery drain of IoT/CIoT devices), DNS, URLs, CNC malware, and/or other malware as well as to receive malware samples for further security analysis. As will now be apparent, network traffic communications can be monitored/filtered using one or more security platforms for network traffic communications in various locations within the 5G network to facilitate cellular IoT battery drain prevention in mobile networks as described herein with respect to various embodiments.

In an example implementation, Security Platform 102 can perform network monitoring over an N2 interface between a Next Generation (NG) Radio Access Network (RAN) (108) and an AMF (112) of a Next Generation Access Protocol (NGAP) over a Stream Control Transmission Protocol (SCTP) on the N2 interface as shown. Security Platform 102 can also perform network monitoring over an N11 interface between an AMF (112) and an SMF (118) of an HTTP/2 protocol over a Transmission Control Protocol (TCP) on the N11 interface as shown. Security Platform 102 can also perform network monitoring over an N3 interface between a RAN (108) and a UPF (114) of a GPRS Tunneling Protocol (GTP-U) over a User Datagram Protocol (UDP) on the N3 interface as shown.

FIG. 1B is another block diagram of a 5G wireless network with a security platform deployment for cellular IoT battery drain prevention in mobile networks in accordance with some embodiments. FIG. 1B is another example service provider network environment for a 5G network architecture that includes a Security Platform 102 in a Control Plane/signaling Network (e.g., the security platforms can be implemented using a firewall (FW)/Next Generation Firewall (NGFW), a network sensor acting on behalf of the firewall, or another device/component that can implement security policies using the disclosed techniques) for providing cellular IoT battery drain prevention in mobile networks as further described below. As shown, the 5G network can also include Fixed/Wired access as shown at 104, Non-3GPP access such as Wi-Fi Access as shown at 106, 5G Radio Access Network (RAN) access as shown at 108, 4G RAN access as shown at 110, and/or other networks (not shown) to facilitate data communications for subscribers (e.g., using User Equipment (UE), such as smart phones, laptops, computers (which may be in a fixed location), and/or other cellular enabled computing devices/equipment, such as IoT/CIoT devices, or other network communication enabled devices) including over a Data Network (e.g., the Internet) 120 to access various applications, web services, content hosts, etc. and/or other networks (not shown). As shown, each of the 5G network access mechanisms 104, 106, 108, and 110 are in communication with 5G User Plane Functions (UPF) 114, which pass through Security Platform 102 via a Switch 116. As also shown, each of the 5G network access mechanisms 104, 106, 108, and 110 are in communication with 5G Access and Mobility Management Function (AMF) 112 and 5G Core Control/Signaling Session Management Function (SMF) 118.

Referring to FIG. 1B, network traffic communications are monitored using Security Platform 102. For example, Security Platform 102 can monitor 5G core/control signaling network traffic communications to facilitate the disclosed techniques, such as for providing cellular IoT battery drain prevention in mobile networks (e.g., including a correlation between monitored GTP-U tunnel sessions and new HTTP/2 based TCP sessions) as further described below. As shown, network traffic communications are monitored/filtered in the 5G network using Security Platform 102 (e.g., (virtual) devices/appliances that each include a firewall (FW), a network sensor acting on behalf of the firewall, or another device/component that can implement security policies using the disclosed techniques) configured to perform the disclosed security techniques as further described below. In addition, Security Platform 102 can also be in network communication with a Cloud Security Service 122 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware (e.g., misbehaving applications that can cause unnecessary battery drain of IoT/CIoT devices), DNS, URLs, CNC malware, and/or other malware as well as to receive malware samples for further security analysis. As will now be apparent, network traffic communications can be monitored/filtered using one or more security platforms for network traffic communications in various locations within the 5G network to facilitate cellular IoT battery drain prevention in mobile networks as described herein with respect to various embodiments.

In an example implementation, Security Platform 102 can perform network monitoring over an N2 interface between a Next Generation (NG) Radio Access Network (RAN) (108) and AMF (112) of a Next Generation Access Protocol (NGAP) over a Stream Control Transmission Protocol (SCTP) protocol on the N2 interface as shown. Security Platform 102 can also perform network monitoring over an N4 interface between an SMF (118) and a UPF (114) of a Packet Forwarding Control Protocol (PFCP) over a User Datagram Protocol (UDP) on the N4 interface as shown. Security Platform 102 can also perform network monitoring over an N3 interface between a RAN (108) and a UPF (114) of a GPRS Tunneling Protocol (GTP-U) over a User Datagram Protocol (UDP) on the N3 interface as shown.

In an example implementation, based on the security platform deployment topology described above, such as similarly described above with respect to FIGS. 1A-B, the subscription identifiers can be extracted as further described below. A PFCP Session Establishment Request is sent over an N4 interface by the control plane (CP) function (e.g., 5G core control/signaling function, such as shown in FIG. 1B) to establish a new PFCP session context in a user plane (UP) function (UPF) (e.g., 5G user plane function, such as shown in FIG. 1B). This message can include optional information element (IE) 'user ID' (e.g., the 'user ID' IE can be included in an N4 session establishment request), which may be present based on an operator policy (e.g., and based on the 3GPP TS 29.244 V16.1 specification, it shall be only sent if the UP function is located in a trusted environment). The 'user ID' IE can include the following information/parameters: International Mobile Subscription Identity (IMSI) (e.g., IMSI is unique not more than 15 digits which shall be allocated to each mobile subscriber as specified in 3GPP TS 23.003).

In one embodiment, the security platform parses Packet Forwarding Control Protocol (PFCP) Session Establishment Request and PFCP Session Establishment Response messages to extract the subscription identifier information, and wherein the subscription identifier information is identified by an International Mobile Subscription Identity (IMSI). For example, the disclosed techniques perform inspection of signaling/control traffic in service provider networks, such as N4 session establishment related traffic (e.g., including PFCP sessions), to extract information exchanged in the N4 session establishment related traffic (e.g., parameters, such as described above and further described below) as well as to monitor tunneled user traffic in service provider networks (e.g., using DPI, such as described above and further described below) for use in applying a security policy based on this extracted information and/or in combination with DPI for facilitating cellular IoT battery drain prevention in mobile networks, such as further described below.

Figure 1C:
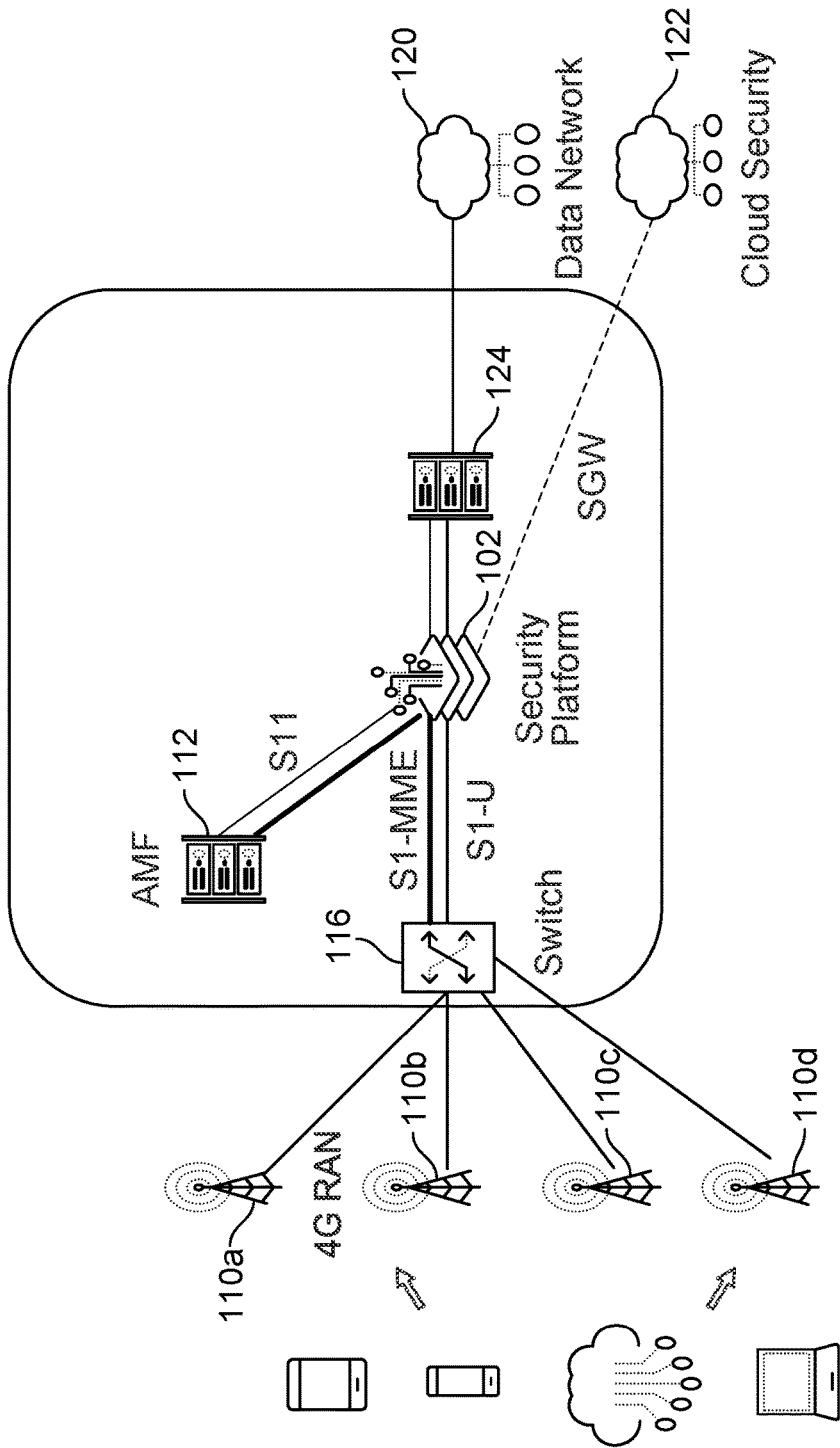
FIG. 1C is a block diagram of a 4G wireless network with a security platform deployment for cellular IoT battery drain prevention in mobile networks in accordance with some embodiments.

FIG. 1C is a block diagram of a 4G wireless network with a security platform deployment for cellular IoT battery drain prevention in mobile networks in accordance with some embodiments. FIG. 1C is an example service provider network environment for a 4G network architecture that includes a Security Platform 102 in a Control Plane/signaling Network (e.g., the security platforms can be implemented using a firewall (FW)/Next Generation Firewall (NGFW), a network sensor acting on behalf of the firewall, or another device/component that can implement security policies using the disclosed techniques) for providing cellular IoT battery drain prevention in mobile networks as further described below. As shown, the 4G network can also include 4G RAN access as shown at 110a-d, as well as other types of network access including Fixed/Wired access (not shown), Non-3GPP access such as Wi-Fi Access (not shown), and/or other networks (not shown) to facilitate data communications for subscribers (e.g., using User Equipment (UE), such as smart phones, laptops, computers (which may be in a fixed location), and/or other cellular enabled computing devices/equipment, such as IoT/CIoT devices, or other network communication enabled devices) including over a Data Network (e.g., the Internet) 120 to access various applications, web services, content hosts, etc. and/or other networks (not shown). As shown, each of the 4G network access mechanisms 110a-d are in communication with Serving Gateway (SGW) 124, which pass through Security Platform 102 via a Switch 116. As also shown, each of the 4G network access mechanisms 110a-d are in communication with a Mobility Management Entity (MME) 112.

Referring to FIG. 1C, network traffic communications are monitored using Security Platform 102. For example, Security Platform 102 can monitor 4G core/control signaling network traffic communications to facilitate the disclosed techniques, such as for providing cellular IoT battery drain prevention in mobile networks as further described below. As shown, network traffic communications are monitored/filtered in the 4G network using Security Platform 102 (e.g., (virtual) devices/appliances that each include a firewall (FW), a network sensor acting on behalf of the firewall, or another device/component that can implement security policies using the disclosed techniques) configured to perform the disclosed security techniques as further described below. In addition, Security Platform 102 can also be in network communication with a Cloud Security Service 122 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware (e.g., misbehaving applications that can cause unnecessary battery drain of IoT/CIoT devices), DNS, URLs, CNC malware, and/or other malware as well as to receive malware samples for further security analysis. As will now be apparent, network traffic communications can be monitored/filtered using one or more security platforms for network traffic communications in various locations within the 4G network to facilitate cellular IoT battery drain prevention in mobile networks as described herein with respect to various embodiments.

In an example implementation, Security Platform 102 can perform network monitoring over an S1 interface between a 4G Radio Access Network (RAN) (110a-d) and an MME (112) of s1 Access Protocol (S1AP) over a Stream Control Transmission Protocol (SCTP) on the S1 interface as shown. Security Platform 102 can also perform network monitoring over an S11 interface between an MME (112) and an SGW (124) of a GPRS Tunneling Protocol Version 2 for Control Plane (GTPv2-C) over a User Datagram Protocol (UDP) on the S11 interface as shown. Security Platform 102 can also perform network monitoring over an S1-U interface between a 4G Radio Access Network (RAN) (110a-d) and an SGW (124) of a GPRS Tunneling Protocol (GTP-U) over a User Datagram Protocol (UDP) on the S1-U interface as shown.

In an example implementation, the security platform is configured to monitor the respective interfaces of the switch, MME, and SGW as shown in FIG. 1C to monitor control/signaling traffic (e.g., GTP-C messages) and tunneled user traffic (GTP-U) to implement a security platform with GTP monitoring capabilities that implements security policies, which can use, for example, parameters, such as location information associated with the subscriber/mobile device, device ID/IMEI, subscriber information/IMSI, and/or RAT, and/or any other parameters/information that can be extracted from control/signaling traffic (e.g., GTP-C messages) as well as performing DPI for IP packets inside the tunnel, as further described below. As described above, the subscriber identity (e.g., IMSI) can be extracted from the Create Session Request message by the security platform, which can be stored (e.g., cached as associated with the IP flow) for use in applying a security policy based on this extracted information and/or in combination with DPI, such as further described below.

Specifically, a Create Session Request message sent from the MME to the SGW can be monitored using the security platform, such as shown in FIG. 1C. The Create Session Request message is a message to allocate a control and data channel for a new network communication access request for a mobile device in a 4G/LTE network (e.g., to be provided with a tunnel for user IP packets for network communications over a mobile service provider's network). For example, the GTP Create Session Request message can include location, hardware identity (e.g., IMEI), subscriber identity (e.g., IMSI), and/or radio access technology (RAT) information in the new network communication access request for the mobile device.

In one embodiment, the security platform monitors GTP-C messages between the MME and SGW as shown (e.g., and, in some cases between the MME, SGW, and Packet Data Network Gateway (PGW) (not shown)) to extract certain information included within GTP-C messages based on a security policy (e.g., monitoring GTPv2-C messages using a pass through firewall/NGFW that is located between the MME, SGW, and/or PGW or using a firewall/NGFW implemented as VM instances or agents executed on the MME, SGW, and/or PGW, and/or other entities in the mobile core network). For example, the security platform can monitor GTP-C messages and extract the subscriber identity (e.g., IMSI), and/or other information from the Create Session Request message, such as further described below.

Thus, these and various other example network architectures can utilize the disclosed security techniques for 4G and 5G mobile network environments in which one or more security platforms can be provided to perform traffic monitoring and filtering to provide new and enhanced 5G related security techniques, including for cellular IoT battery drain prevention in mobile networks for service providers based on signaling and DPI information as further described below. As will now be apparent to one of ordinary skill in the art in view of the disclosed embodiments, one or more security platforms can similarly be provided in various other locations within these network architectures (e.g., an inline, pass-through NGFW, such as shown by Security Platforms as shown in FIGS. 1A-C, and/or implemented as agents or virtual machine (VM) instances, which can be executed on existing devices in the service provider's network, such as entities within the 4G/5G User Plane Functions and/or within the 4G/5G Core Control/Signaling Functions as shown in FIGS. 1A-C) and in various wireless network environments to perform the disclosed security techniques as further described below.

Figure 2:
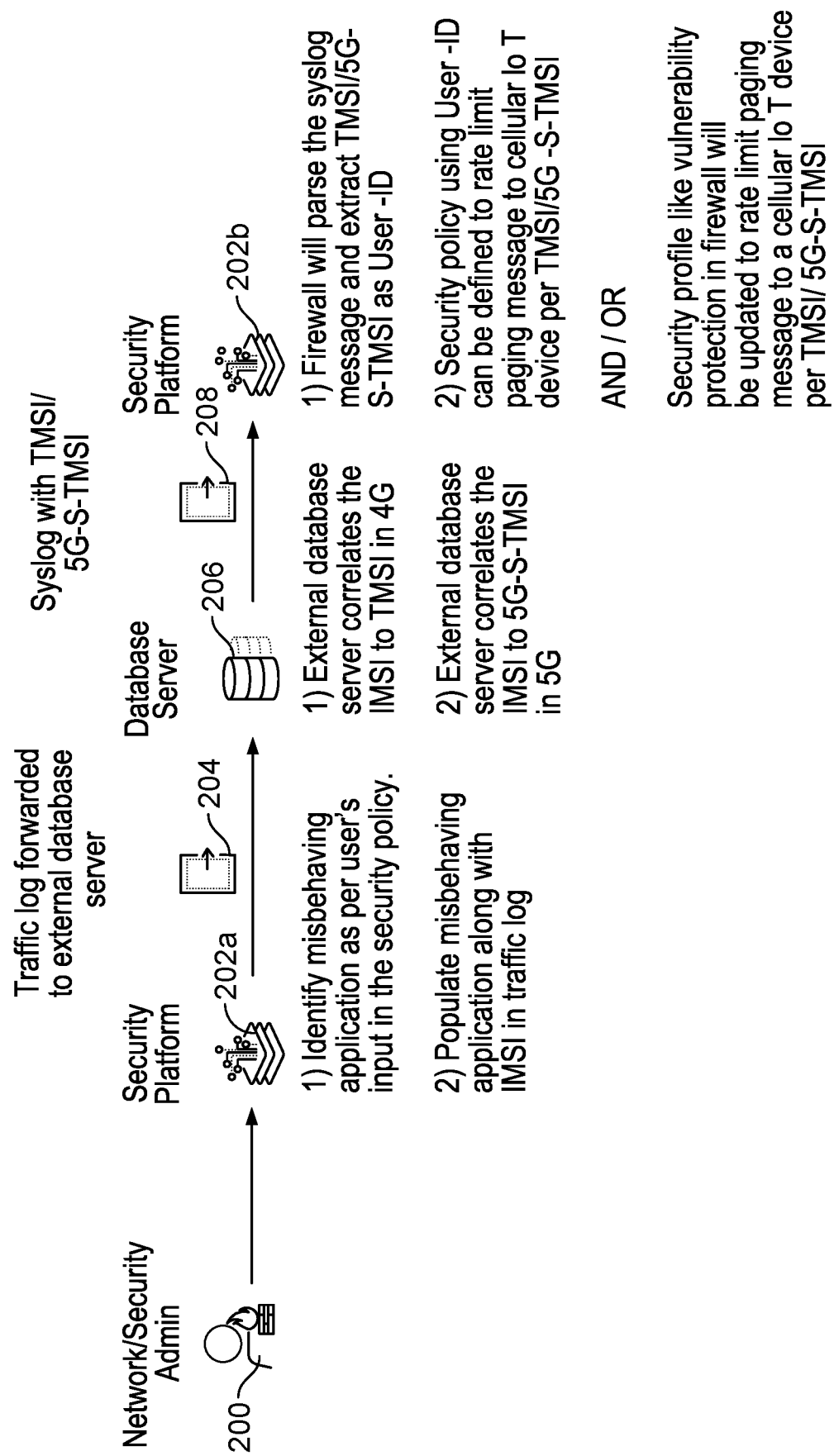
FIG. 2 is a process architecture diagram of a 5G wireless network with a security platform deployment for cellular IoT battery drain prevention in mobile networks in accordance with some embodiments.

FIG. 2 is a process architecture diagram of a 5G wireless network with a security platform deployment for cellular IoT battery drain prevention in mobile networks in accordance with some embodiments. Referring to FIG. 2, a Network/Security Administrator (Admin) 200 configures a security policy or a security profile for a Security Platform 202a (e.g., deployed on the access side of a mobile network to throttle/rate limit signaling messages sent to IoT/CIoT devices with chatty/misbehaving applications) to facilitate rate limiting of paging messages per application which are sent via mobile networks to endpoint/user equipment using the disclosed techniques as further described below.

As shown, Security Platform 202a monitors network traffic for an application sending paging messages based on a security policy or a security profile (e.g., a vulnerability profile, such as further described below) to identify a misbehaving application (e.g., an application can be determined to be misbehaving based on a security policy configuration as configured by the Network/Security Admin and/or dynamic profile, such as using heuristic-based techniques and/or machine learning techniques (MLT), such as further described below).

In an example implementation, Security Platform 202a captures a traffic log for the detected application sending paging messages based on the security policy or the security profile application along with an associated International Mobile Subscriber Identity (IMSI) to effectively populate a misbehaving application along with IMSI in the traffic log as similarly described above. As shown at 204, Security Platform 202a forwards the traffic log to a Database Server 206 (e.g., an external server/data store).

As shown, Database Server 206 correlates the IMSI to, for example, a Temporary Mobile Subscriber Identity (TMSI) in 4G networks and to a 5G-S-TMSI in 5G networks. Database Server 206 then sends the correlated TMSI/5G-S-TMSI to the security platform in a Syslog Message 208 that includes the TMSI or 5G-S-TMSI information to the same security platform and/or a different security platform(s) as shown at 202b. The TMSI is stored along with the IMSI in the network. In an example 4G mobile network environment, the MME is configured to be capable of correlating an allocated TMSI with the IMSI. In an example 5G mobile network environment, the AMF is configured to be capable of correlating an allocated 5G-S-TMSI with the IMSI/SUPI. In an example implementation, the external server can be configured to include a correlation mechanism with IMSI, TMSI/5G-S-TMSI databases or can perform a query of the MME and/or AMF to obtain such information for performing the correlation operations.

Security Platform 202b parses Syslog Message 208 and extracts the TMSI/5G-S-TMSI as a User-ID parameter for performing security policy enforcement. For example, Security Platform 202b enforces a security policy to perform a rate limiting (e.g., throttling) of paging messages using the correlated TMSI/5G-S-TMSI (e.g., the security policy can be enforced by the security platform using this User-ID to enforce a configured threshold for rate limit paging messages to a cellular IoT device per TMSI/5G-S-TMSI). For instance, the security policy can be configured to be limited to one paging message per day, one paging message per week for a given IoT device, and/or some other configured limit value per a specified time period for such paging messages per such endpoint/user equipment. As another example, Security Platform 202b enforces a security profile, such as a vulnerability profile, which can be updated to similarly perform a rate limiting (e.g., throttling) of paging messages using the correlated TMSI/5G-S-TMSI.

As such, the misbehaving application can be detected based on a user defined security policy and/or dynamically defined based on a security profile such as a vulnerability profile to rate limit paging messages to, for example, a cellular IoT device per TMSI/5G-S-TMSI. For example, security policies can be configured to specify/define the application and rate limiting configurations, and when traffic from this application is detected, then a 5-Tuple (Source/Destination Port, Source/Destination IP, etc. and IMSI) can be extracted using the security platform (e.g., a firewall device or another network device, which can perform rate limiting paging messages over the mobile network, such as a 4G or 5G cellular network).

Example Use Cases of Enhanced Security for 5G Networks for Service Providers

The disclosed techniques for providing enhanced security for 5G mobile/service provider networks using a security platform for security policy enforcement can be applied in a variety of additional example use case scenarios for facilitating enhanced and more flexible and dynamic security for 5G mobile/service provider network environments including for cellular IoT battery drain prevention in mobile networks. Additional example use case scenarios will be further described below.

As a first example use case scenario, assume that mobile and converged network operators are offering wireless IoT technologies (e.g., CIoT devices) including Narrowband IoT (NB-IoT) and LTE-M to IoT/M2M customers, such as utilities (e.g., gas, water, electric, etc.), water meter management companies, fleet tracking companies, and/or other types of customers. Most of the CIoT devices do not have compute capabilities and resources to provide security functionality and typically are not securely coded. As a result, this creates an opportunity for mobile and converged network operators to offer network-based security services to these customers that can be provided using the disclosed techniques for enhanced security for CIoT in mobile/service provider networks using a security platform for security policy enforcement (e.g., using inspection and security capabilities on an N3 and interface as described herein).

As a second example use case scenario, assume that mobile and converged network operators are offering wireless IoT technologies (e.g., CIoT devices) including Narrowband IoT (NB-IoT) and LTE-M to IoT/M2M customers, such as utilities (e.g., gas, water, electric, etc.), water meter management companies, fleet tracking companies, and/or other types of customers. Most of the CIoT devices do not have compute capabilities and resources to provide security functionality and typically are not securely coded. As a result, this can lead to CIoT device initiated attacks on the mobile network to which they are connected (e.g., and MEC system). As similarly described herein, the disclosed techniques for enhanced security for CIoT in mobile/service provider networks using a security platform for security policy enforcement including inspection and security capabilities on an S11-U interface can be performed to protect the critical network elements of mobile networks from attacking CIoT devices.

Examples of IoT Threats

As an example of such an IoT threat scenario, an attacker may attempt to attack endpoint/mobile devices (e.g., IoT devices) by sending messages (e.g., paging messages, which can generally be used for sending network data to endpoint/user equipment, over various protocols for 4G networks and over the Next Generation Access Protocol (NGAP) over the Stream Control Transmission (SCTP) protocol for 5G networks) to drain batteries of such targeted endpoint/mobile devices (e.g., IoT devices).

As an example, an Android VoIP application popular in Japan used frequent keep-alive messages even when the users were idle, causing a signaling overload and a major outage in the mobile network (see Gorbil et al., Storms in Mobile Networks, IEEE Transactions on Emerging Topics, Vol. XX, No. X, 2015, available at https://arxiv.org/pdf/1411.1280.pdf).

As an example of misbehaving applications that can cause paging signaling storms and outage in mobile networks, 5G is challenged by broadband requirements such as video streaming and the Internet of Things (IoT) that often require low signaling overhead and quality of service (QoS) with higher traffic volume and bandwidths. However, the mobile network control plane can be attacked by short and frequent communications that take advantage of vulnerabilities in signaling such as paging, service requests, and radio resource control (RRC). Such attacks can compromise a large number of mobile devices, or can target a list of mobiles by carefully timing the transmissions. Furthermore, signaling storms can be the result of malfunctioning apps that repeatedly establish and tear-down data connections with a serious effect on the Quality of Service (QoS) of the network control plane (see Gelenbe et al., Detection and mitigation of signaling storms in mobile network, 2016 International Conference on Computing, Networking and Communications (ICNC), available at https://ieeexplore.ieee.org/abstract/document/7440686).

As an example of the potential impact of signaling storms in the mobile networks, misbehaving applications can cause paging signaling storms and outage in mobile networks (see J. Senor, H. Zang, J. C. Bolot, "Impact of paging channel overloads or attacks on a cellular network", Proc. 5th ACM Workshop Wireless Security (WiSe'06), pp. 75-84, September 2006).

As will now be apparent in view of the disclosed embodiments, a network service provider/mobile operator (e.g., a cellular service provider entity), a device manufacturer (e.g., a CIoT device entity and/or other device manufacturer of such CIoT devices, such as smart logistics, smart farming, smart parking, smart traffic management, smart environment, smart wearables, and/or other types of CIoT devices), and/or system integrators can specify such security policies that can be enforced by a security platform using the disclosed techniques to solve these and other technical network security challenges, including technical network security challenges for cellular IoT battery drain prevention in mobile/service provider network environments.

Figure 3:
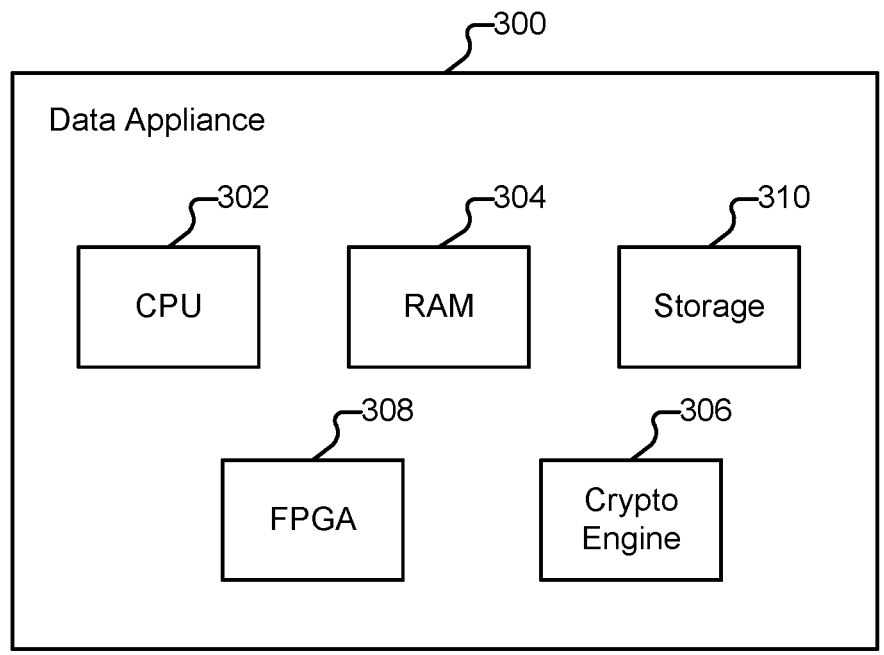
FIG. 3 is a functional diagram of hardware components of a network device for cellular IoT battery drain prevention in mobile networks in accordance with some embodiments.

Example Hardware Components of a Network Device Cellular IoT Battery Drain Prevention in Mobile Networks for Service Providers FIG. 3 is a functional diagram of hardware components of a network device for cellular IoT battery drain prevention in mobile networks in accordance with some embodiments. The example shown is a representation of physical/hardware components that can be included in network device 300 (e.g., an appliance, gateway, or server that can implement the security platform disclosed herein). Specifically, network device 300 includes a high performance multi-core CPU 302 and RAM 304. Network device 300 also includes a storage 310 (e.g., one or more hard disks or solid state storage units), which can be used to store policy and other configuration information as well as signatures. In one embodiment, storage 310 stores a traffic log for a misbehaving application, IMSI, TMSI/5G-S-TMSI (e.g., associated with a User-ID as similarly described above), and associated IP addresses/port numbers and possibly other information (e.g., Application-ID, Content-ID, User-ID, URL, and/or other information) that are monitored for implementing the disclosed security policy enforcement techniques using a security platform/firewall device. Network device 300 can also include one or more optional hardware accelerators. For example, network device 300 can include a cryptographic engine 306 configured to perform encryption and decryption operations, and one or more FPGAs 308 configured to perform signature matching, act as network processors, and/or perform other tasks.

Figure 4:
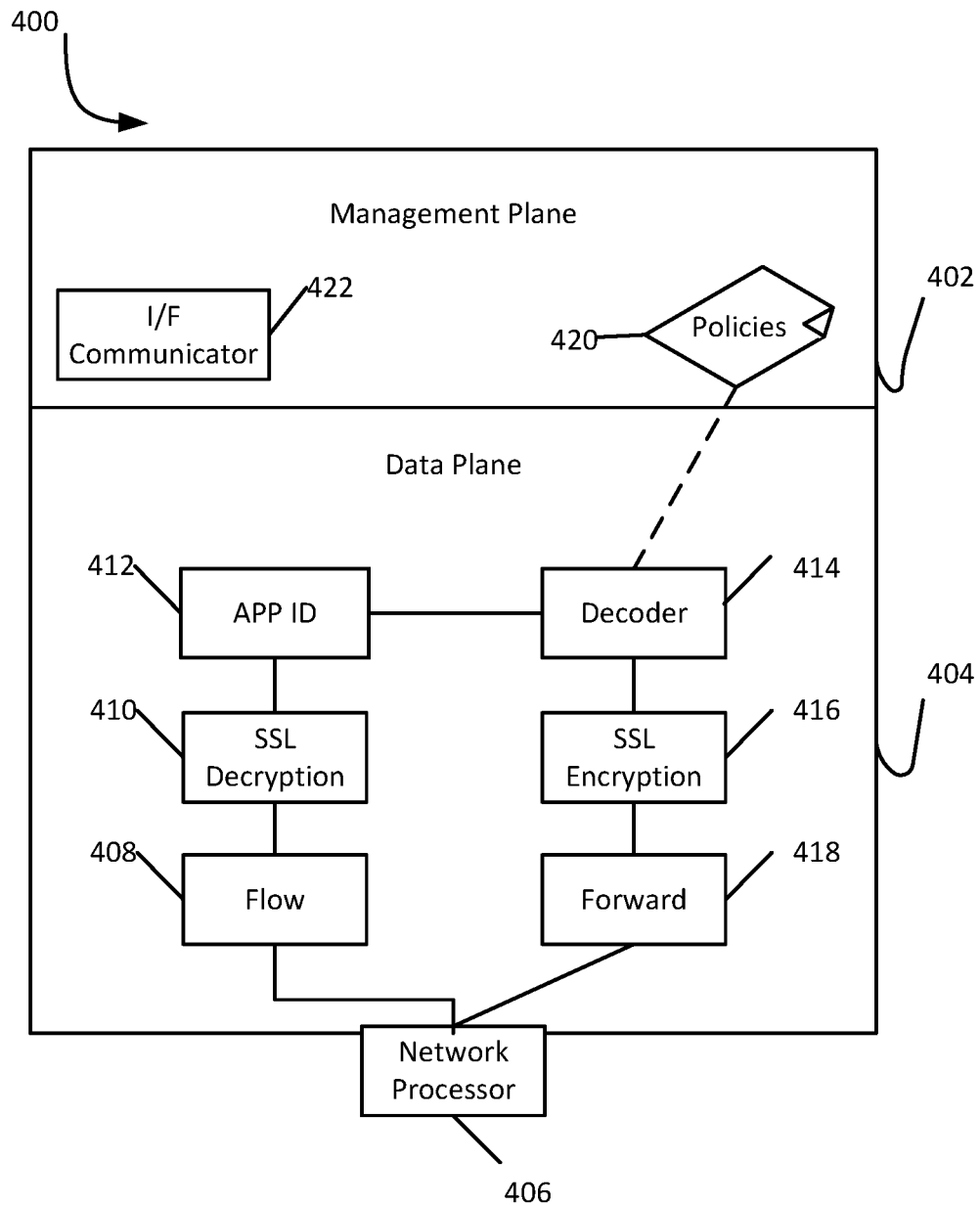
FIG. 4 is a functional diagram of logical components of a network device for cellular IoT battery drain prevention in mobile networks in accordance with some embodiments.

Example Logical Components of a Network Device Cellular IoT Battery Drain Prevention in Mobile Networks for Service Providers FIG. 4 is a functional diagram of logical components of a network device for cellular IoT battery drain prevention in mobile networks in accordance with some embodiments. The example shown is a representation of logical components that can be included in network device 400 (e.g., a data appliance, which can implement the disclosed security platform and perform the disclosed techniques). As shown, network device 400 includes a management plane 402 and a data plane 404. In one embodiment, the management plane is responsible for managing user interactions, such as by providing a user interface for configuring policies and viewing log data. The data plane is responsible for managing data, such as by performing packet processing and session handling.

Suppose a mobile device attempts to access a resource (e.g., a remote web site/server, an IoT device such as a CIoT device, or another resource) using an encrypted session protocol, such as SSL. Network processor 406 is configured to monitor packets from the mobile device, and provide the packets to data plane 404 for processing. Flow 408 identifies the packets as being part of a new session and creates a new session flow. Subsequent packets will be identified as belonging to the session based on a flow lookup. If applicable, SSL decryption is applied by SSL decryption engine 410 using various techniques as described herein. Otherwise, processing by SSL decryption engine 410 is omitted. Application identification (APP ID) module 412 is configured to determine what type of traffic the session involves and to identify a user associated with the traffic flow (e.g., to identify an Application-ID as described herein). For example, APP ID 412 can recognize a GET request in the received data and conclude that the session requires an HTTP decoder 414. As another example, APP ID 412 can recognize a GTP-U message (e.g., N4 session establishment request/response messages, and conclude that the session requires a GTP decoder) (e.g., to extract information exchanged in the N4 session establishment related messages including various parameters, such as International Mobile Subscription Identity (IMSI), International Mobile Equipment Identifier (IMEI), Mobile Subscriber ISDN (MSISDN), and/or Network Access Identifier (NAI) related information) and conclude that the session requires a GTP decoder. For each type of protocol, there exists a corresponding decoder 414. In one embodiment, the application identification is performed by an application identification module (e.g., APP ID component/engine), and a user identification is performed by another component/engine. Based on the determination made by APP ID 412, the packets are sent to an appropriate decoder 414. Decoder 414 is configured to assemble packets (e.g., which may be received out of order) into the correct order, perform tokenization, and extract out information (e.g., such as described above to extract various information exchanged in the N4 session establishment related messages as similarly described above). Decoder 414 also performs signature matching to determine what should happen to the packet. SSL encryption engine 416 performs SSL encryption using various techniques as described herein and the packets are then forwarded using a forward component 418 as shown. As also shown, policies 420 are received and stored in the management plane 402. In one embodiment, policy enforcement (e.g., policies can include one or more rules, which can be specified using domain and/or host/server names, and rules can apply one or more signatures or other matching criteria or heuristics, such as for security policy enforcement for subscriber/IP flows on service provider networks based on various extracted parameters/information from monitored HTTP/2 messages and/or DPI of monitored GTP-U traffic as disclosed herein) is applied as described herein with respect to various embodiments based on the monitored, decrypted, identified, and decoded session traffic flows.

As also shown in FIG. 4, an interface (I/F) communicator 422 is also provided for security platform manager communications (e.g., via (REST) APIs, messages, or network protocol communications or other communication mechanisms). In some cases, network communications of other network elements on the service provider network are monitored using network device 400, and data plane 404 supports decoding of such communications (e.g., network device 400, including I/F communicator 422 and decoder 414, can be configured to monitor and/or communicate on, for example, interfaces such as N2, N3, N4, N11, and/or other interfaces where wired and wireless network traffic flow exists as similarly described herein). As such, network device 400 including I/F communicator 422 can be used to implement the disclosed techniques for security policy enforcement on mobile/service provider network environments, including for cellular IoT battery drain prevention in mobile networks, as described above and as will be further described below.

FIG. 5 is a screenshot diagram of a security policy for performing cellular IoT battery drain prevention in mobile networks in accordance with some embodiments. Referring to FIG. 5, the example screen shot for configuring a security policy for a security platform includes an application (e.g., a misbehaving application) as shown at 502, a security profile with rate limiting rules for paging messages as shown at 504, and a User-ID column/field with TMSI and/or 5G-S-TMSI identifiers as shown at 506 to facilitate performing the disclosed techniques for performing cellular IoT battery drain prevention in mobile networks as similarly described above and further described below.

Additional example processes for the disclosed techniques for performing enhanced security for CIoT on mobile/service provider network environments will now be described.

Figure 6:
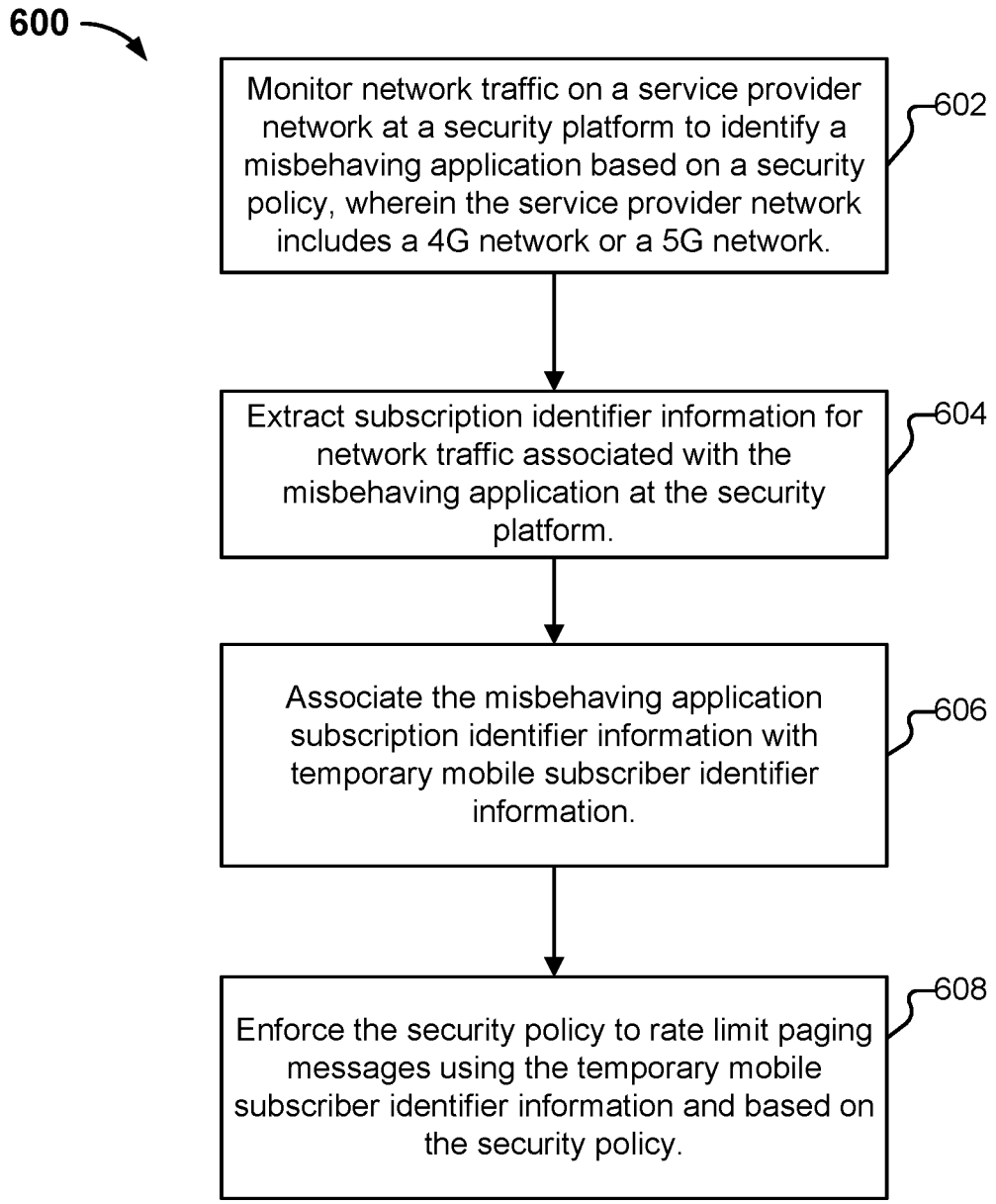
FIG. 6 is a flow diagram of a process for performing cellular IoT battery drain prevention in mobile networks in accordance with some embodiments.

Example Processes for Cellular IoT Battery Drain Prevention in Mobile Networks for Service Providers FIG. 6 is a flow diagram of a process for performing cellular IoT battery drain prevention in mobile networks in accordance with some embodiments. In some embodiments, a process 600 as shown in FIG. 6 is performed by the security platform and techniques as similarly described above including the embodiments described above with respect to FIGS. 1A-5. In one embodiment, process 600 is performed by data appliance 300 as described above with respect to FIG. 3, network device 400 as described above with respect to FIG. 4, a virtual appliance, an SDN security solution, a cloud security service, and/or combinations or hybrid implementations of the aforementioned as described herein.

The process begins at 602. At 602, monitoring network traffic on a service provider network at a security platform to identify a misbehaving application based on a security policy, wherein the service provider network includes a 4G network or a 5G network, is performed. For example, the security platform (e.g., a firewall, a network sensor acting on behalf of the firewall, or another device/component that can implement security policies) can monitor GTP-U and HTTP/2 traffic on the mobile core network as similarly described above.

At 604, extracting subscription identifier information for network traffic associated with the misbehaving application at the security platform is performed. For example, the security platform can parse various protocols and messages to extract the subscription identifier information (e.g., IMSI related information), using DPI-based firewall techniques as similarly described above, such as with respect to FIGS. 1A-C and 2.

At 606, associate the misbehaving application subscription identifier information with temporary mobile subscriber identifier information is performed. For example, this operation of associating the misbehaving application subscription identifier information with temporary mobile subscriber identifier information can be performed using a server/data store (e.g., an external server/data store) and correlating the IMSI to, for example, a Temporary Mobile Subscriber Identity (TMSI) in 4G networks and to a 5G-S-TMSI in 5G networks, as similarly described above, such as with respect to FIGS. 1A-C and 2.

At 608, enforcing the security policy at the security platform to rate limit paging messages sent to an endpoint device using the subscription identifier information and based on the security policy is performed. For example, various rate limiting/throttling enforcement actions can be performed using the security platform as similarly described above, such as with respect to FIGS. 1A-C and 2.

As will now be apparent in view of the disclosed embodiments, a network service provider/mobile operator (e.g., a cellular service provider entity), a device manufacturer (e.g., an automobile entity, IoT device entity, and/or other device manufacturer), and/or system integrators can specify such security policies that can be enforced by a security platform using the disclosed techniques to solve these and other technical network security challenges for providing cellular IoT battery drain prevention in mobile networks, including 4G and 5G networks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor network traffic on a service provider network at a security platform to identify a misbehaving application based on a security policy, wherein the service provider network includes a 4G network or a 5G network;
extract subscription identifier information for network traffic associated with the misbehaving application at the security platform, wherein the subscription identifier information is identified by International Mobile Subscription Identity (IMSI) related information;
correlate the IMSI to a Temporary Mobile Subscriber identity (TMSI) in the 4G network or a 5G-S-TMSI in the 5G network;
parse a message in the network traffic to extract the TMSI or the 5G-S-TMSI as a User-ID parameter for performing security policy enforcement; and
enforce the security policy at the security platform to rate limit paging messages sent to an endpoint device using the subscription identifier information and based on the security policy, comprising to:
enforce, using the User-ID, a configured threshold for the rate limit paging messages to the endpoint device; and
a memory coupled to the processor and configured to provide the processor with instructions.

2. The system recited in claim 1, wherein the endpoint device includes a cellular Internet of Things (IoT) device.

3. The system recited in claim 1, wherein the security platform is configured with a plurality of security policies for each of a plurality of misbehaving applications.

4. The system recited in claim 1, wherein the security platform parses Packet Forwarding Control Protocol (PFCP) Session Establishment Request and PFCP Session Establishment Response messages to extract the subscription identifier information.

5. The system recited in claim 1, wherein the security platform monitors wireless interfaces including a plurality of interfaces for a control protocol and user data traffic in a mobile core network for a 4G network.

6. The system recited in claim 1, wherein the security platform monitors wireless interfaces including a plurality of interfaces for a control protocol and user data traffic in a mobile core network for a 5G network.

7. The system recited in claim 1, wherein the security platform is configured to perform a firewall service using the subscription identifier information.

8. A method, comprising:
monitoring network traffic on a service provider network at a security platform to identify a misbehaving application based on a security policy, wherein the service provider network includes a 4G network or a 5G network;
extracting subscription identifier information for network traffic associated with the misbehaving application at the security platform; platform, wherein the subscription identifier information is identified by International Mobile Subscription Identity (IMSI) related information;
correlating the IMSI to a Temporary Mobile Subscriber identity (TMSI) in the 4G network or a 5G-S-TMSI in the 5G network;
parsing a message in the network traffic to extract the TMSI or the 5G-S-TMSI as a User-ID parameter for performing security policy enforcement and enforcing the security policy at the security platform to rate limit paging messages sent to an endpoint device using the subscription identifier information and based on the security policy, comprising:
enforcing, using the User-ID, a configured threshold for the rate limit paging messages to the endpoint device.

9. The method of claim 8, wherein the endpoint device includes a cellular Internet of Things (IoT) device.

10. The method of claim 8, wherein the security platform is configured with a plurality of security policies for each of a plurality of misbehaving applications.

11. The method of claim 8, wherein the security platform parses Packet Forwarding Control Protocol (PFCP) Session Establishment Request and PFCP Session Establishment Response messages to extract the subscription identifier information, and wherein the subscription identifier information.

12. The method of claim 8, wherein the security platform monitors wireless interfaces including a plurality of interfaces for a control protocol and user data traffic in a mobile core network for a 4G network.

13. The method of claim 8, wherein the security platform monitors wireless interfaces including a plurality of interfaces for a control protocol and user data traffic in a mobile core network for a 5G network.

14. The method of claim 8, wherein the security platform is configured to perform a firewall service using the subscription identifier information.

15. A computer program product, the computer program product being embodied in a tangible non-transitory computer readable storage medium and comprising computer instructions for:

monitoring network traffic on a service provider network at a security platform to identify a misbehaving application based on a security policy, wherein the service provider network includes a 4G network or a 5G network;

extracting subscription identifier information for network traffic associated with the misbehaving application at the security; platform, wherein the subscription identifier information is identified by International Mobile Subscription Identity (IMSI) related information;

correlating the IMSI to a Temporary Mobile Subscriber identity (TMSI) in the 4G network or a 5G-S-TMSI in the 5G network;

parsing a message in the network traffic to extract the TMSI or the 5G-S-TMSI as a User-ID parameter for performing security policy enforcement and enforcing the security policy at the security platform to rate limit paging messages sent to an endpoint device using the subscription identifier information and based on the security policy, comprising:

enforcing, using the User-ID, a configured threshold for the rate limit paging messages to the endpoint device.

16. The computer program product recited in claim 15, wherein the endpoint device includes a cellular Internet of Things (IoT) device.

17. The computer program product recited in claim 15, wherein the security platform is configured with a plurality of security policies for each of a plurality of misbehaving applications.

\* \* \* \* \*